(12) United States Patent
Tampieri

(10) Patent No.: US 8,382,635 B2
(45) Date of Patent: Feb. 26, 2013

(54) EPICYCLIC REDUCTION GEAR DEVICE WITH BALANCED PLANET WHEELS

(76) Inventor: Alfredo Tampieri, Bologna (IT)

(*) Notice: Subject to any disclaimer, the term of this patent is extended or adjusted under 35 U.S.C. 154(b) by 187 days.

(21) Appl. No.: 13/063,530

(22) PCT Filed: Sep. 11, 2009

(86) PCT No.: PCT/IB2009/006806
§ 371 (c)(1),
(2), (4) Date: Mar. 11, 2011

(87) PCT Pub. No.: WO2010/029421
PCT Pub. Date: Mar. 18, 2010

(65) Prior Publication Data
US 2011/0165990 A1 Jul. 7, 2011

(30) Foreign Application Priority Data
Sep. 11, 2008 (IT) .............................. BO2008A0554

(51) Int. Cl.
*F16H 57/08* (2006.01)

(52) U.S. Cl. ........................................................ 475/331

(58) Field of Classification Search .................. 475/331, 475/337, 346, 347
See application file for complete search history.

(56) References Cited

U.S. PATENT DOCUMENTS

| | | | |
|---|---|---|---|
| 6,715,291 B1 | 4/2004 | Liao | |
| 7,297,086 B2 * | 11/2007 | Fox | 475/331 |
| 2003/0153427 A1 * | 8/2003 | Mayranen | 475/331 |
| 2006/0205557 A1 * | 9/2006 | Arndt et al. | 475/331 |
| 2006/0247089 A1 | 11/2006 | Guo et al. | |
| 2007/0275816 A1 * | 11/2007 | Henderson | 475/331 |

FOREIGN PATENT DOCUMENTS

FR 25072 E 12/1922

OTHER PUBLICATIONS

International Search Report, Nov. 12, 2009.

* cited by examiner

*Primary Examiner* — Edwin A Young
(74) *Attorney, Agent, or Firm* — William J. Sapone

(57) ABSTRACT

An epicyclic reduction gear device includes a cylindrical housing (1), having an internal circumference equipped with at least a crown wheel (2), at least a first train-carrier (7) rotatable inside the housing (1) and supporting a first output shaft (13), at least a planetary first wheel set (3a, 3b, 3c), hinged on relative pins (6a, 6b, 6c) fixed at the first train-carrier (7) and provided with related toothed portions (9a, 9b, 9c) engaged with the crown wheel (2), and a solar gear wheel (4) which is integral with an input shaft (10) and which is engaging with the planetary wheels (3a, 3b, 3c). The reduction gear device (12) has at least a first idle gear wheel (5) which is pivoted on the first train-carrier (7) and which engages two wheels (3a, 3b) of the planetary wheels (3a, 3b, 3c) in order to allow force balancing.

10 Claims, 1 Drawing Sheet

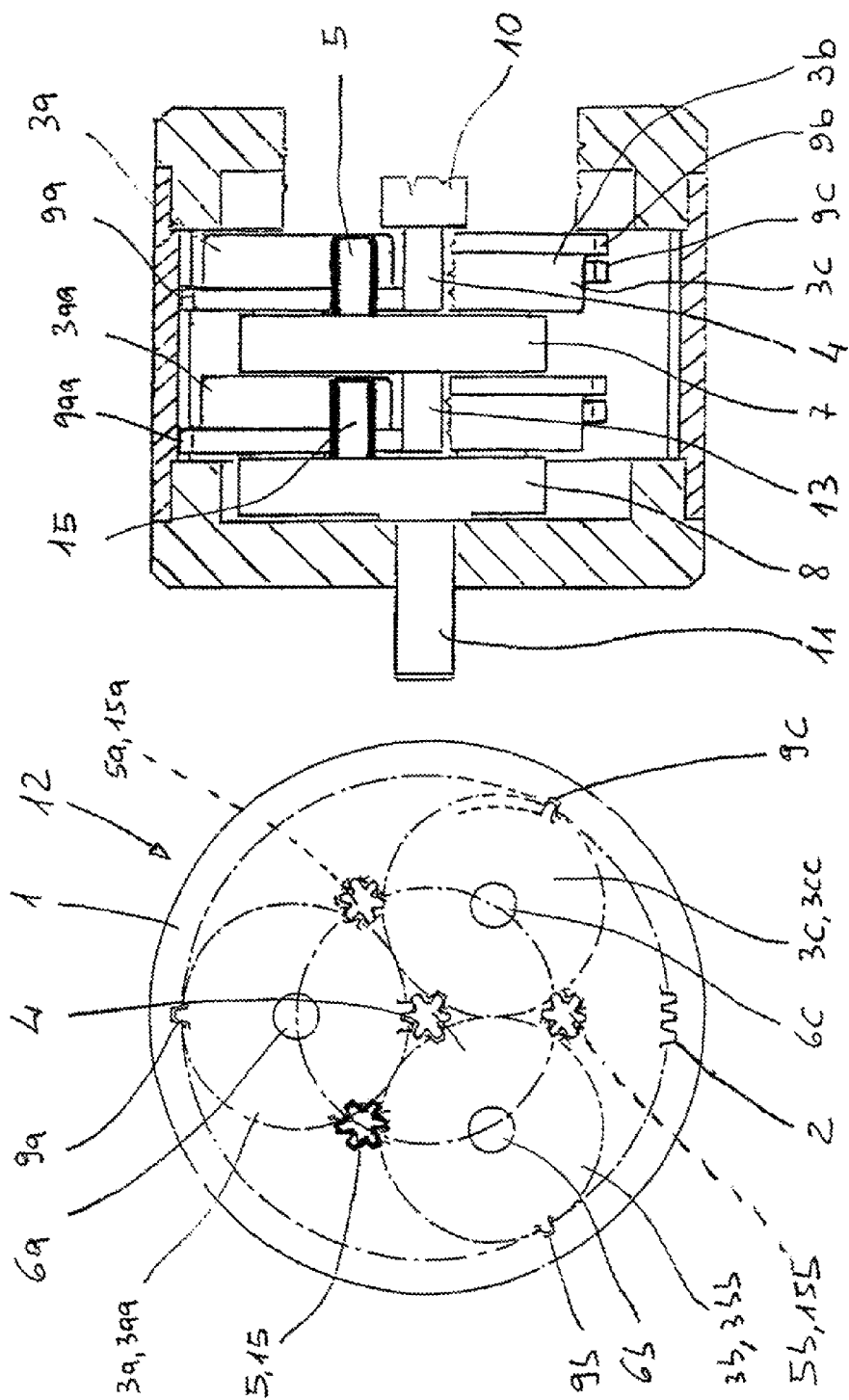

EPICYCLIC REDUCTION GEAR DEVICE WITH BALANCED PLANET WHEELS

TECHNICAL FIELD

The present invention refers to devices for reducing revolution number of a motor, in particular refers to an epicyclic reduction gear device with planet wheels.

BACKGROUND OF THE INVENTION

As it is known, the speed reducers have the purpose to reduce the rotation speed of an output shaft with respect to the rotation speed of the drive shaft. In particular the simple type epicyclic reducer trains consist of three elements, two at the end, called sun wheel or sun gear and crown wheel or ring gear, and a train-carrier free to rotate around a common axis. Such reducers usually include: a retaining cylindrical housing provided with a teeth made on its internal circumferential surface, a plurality of planetary gear wheels, generally three spaced 120° each other with axis parallel to the output axis, and idle on the respective pins integral with the train-carrier in order to be engaged with the teeth of the retaining housing.

Moreover the known reducer include a toothed sun wheel coupled to an input shaft engaging the planetary wheels.

The known reducers allow a direct motorization, high precision and power and an only radial directed stress strongly attenuated by the mesh in three (or more) points, and the limits of reduction ratio are overcome with solutions providing two (or more) trains in cascade.

A disadvantage of these known reducers consists in the lengthening of the sun gear wheel on an average of ⅓ with respect to the normal ratio module/length of the teeth and in the increasing of the torque and deflection stresses which determine noisiness and efficiency loss.

DISCLOSURE OF THE INVENTION

The main object of this invention is the propose an epicyclic reduction gear device fit to balance the force system carrying the whole wheel train at its maximum efficiency.

Another object is the propose an epicyclic reduction gear device fit to obtain high reduction ratio and to maintain power characteristics with acceptable axial and radial dimensions.

DESCRIPTION OF THE DRAWINGS

The characteristics of the invention are in the followed evidenced with particular reference to the joined drawings in which:

FIG. 1 shows a front view of the first train of the reduction gear device to which parts have been removed to better evidence others;

FIG. 2 shows a sectional view of the reduction gear device comprising two planetary trains.

BEST MODE FOR CARRYING OUT THE INVENTION

With reference to FIGS. 1 and 2, the device includes a train-carrier 7 supporting a first output shaft 13 and contained in a cylindrical housing 1, provided with a toothed crown wheel 2 made on its internal circumference.

A first train includes three planetary wheels, respectively first 3a, second 3b and third 3c with toothed portions 9a, 9b, 9c axially staggered, partially superimposed and pivotally mounted on relative pins 6a, 6b and 6c fixed to a first train-carrier 7 rotating inside the housing 1. The toothed portions 9a, 9b and 9c are engaged with the toothed crown wheel 2.

A sun gear 4 integral with an input shaft 10, is interposed between the planet wheels of the first train 3a, 3b and 3c in coupling with the related toothed portions 6a, 6b and 6c.

A first idle wheel 5 is pivoted to the train-carrier 7 on a parallel pin and at the same portion with respect to the rotational pins of the planetary 9a, 9b, 9c. The idle wheel 5 is provided with teeth engaging the toothed portions 9a and 9b of the couple of planet wheels 3a and 3b.

This idle wheel 5, though being pulled in rotation as an element passive, it makes the distribution of the used forces into the kinematic system of the epicyclic reduction gear device, or acts as balanced element of the same forces. In this way it is possible to reach the maximum efficiency by the whole epicyclic reduction gear device and obtain consequent very high reduction ratios of the type 1 to 555 (554+1) and much more with reference to module 1, solar wheel 18 (teeth or diameter), crown wheel 9972 (teeth or diameter) with planetary wheels with staggered teeth as in FIG. 2. The crown wheel with 9972 is referred to a possible greatest ratio of 1 to 13,85 obtainable with planetary wheel with full teeth.

A variant of the invention provides the use of one or two further idle wheels, respectively a second wheel 5a engaging with the second planetary wheel 3b and third wheel 3c, and a third wheel 5b which engages with the first planetary wheel 3a and the third planetary wheel 3c.

It is appropriate to evidence that the epicyclic reduction gear device according to the invention, in addition to the classical configuration with three planet wheel 3a, 3b and 3c, can be made acting on the variable module, in not shown embodiments, with four or five planetary wheels. Consequently it can furthermore be used corresponding idle gear wheels between pairs of adjacent planetary wheels.

Making particular reference to FIG. 2, the epicyclic reduction gear device 12 object of the present invention includes a second train-carrier 8 contained within the housing 1, bearing a second output shaft 11. On the relative pins of the second train-carrier 8, a second train of three planetary 3aa, 3bb, and 3cc is pivotally mounted and is driven by a sun induced wheel integral and coinciding with the first output shaft 13, supported by the first train-carrier 7.

A second idle wheel 15 is pivoted to the train-carrier 8 on a parallel pin and at the same portion with respect to the rotational pins of the planetary wheels 3aa, 3bb and 3cc, in order to further increase the balancing of the actual forces. The idle wheel 15 is provided with teeth engaging the toothed portions of the pair of planetary wheels 3aa and 3bb.

A variant of the invention provides the use of one or two further idle wheels, respectively a second wheel 15a which engages with the second planetary wheels 3bb and third 3cc, and a third wheel 15b engaging the first planet wheel 3aa and the third planet wheel 3cc.

The use of this second reduction stage allows to arrive to a reduction ratio of 1:308025 with module 1 and two trains of planetary of identical sizes and characteristics.

Further variations can consist in using further trains (3 or 4) in order to drastically reduce the radial sizes of the reduction gear device, without reducing the reduction or enlarging ratio using the output shafts as input shafts and vice-versa.

An advantage of this invention is to supply an epicyclic reduction gear device fit to balance the system of present forces to carry the whole articulated system to the maximum efficiency.

Further advantage is therefore to supply an epicyclic reduction gear device fit to obtain high reduction ratios and to maintain power characteristics with acceptable axial and radial dimensions.

The invention claimed is:

1. Epicyclic reduction gear device comprising:
   a cylindrical housing (1), having an internal circumference equipped with at least a crown wheel (2);
   at least a first train-carrier (7) rotatable inside the housing (1) and supporting a first output shaft (13);
   at least a planetary first wheel set (3a, 3b, 3c), hinged on relative pins (6a, 6b, 6c) fixed at the first train-carrier (7) and provided with related toothed portions (9a, 9b, 9c) engaged with the crown wheel (2);
   a solar gear wheel (4) which is integral with an input shaft (10) and which is engaging with the planetary wheels (3a, 3b, 3c);
   said reduction gear device (12) having at least a first idle gear wheel (5) which is pivoted on the first train-carrier (7) and which engages two wheels (3a, 3b) of the planetary wheels (3a, 3b, 3c) in order to allow force balancing.

2. Reduction gear device according to claim 1 further comprising additional idle gear wheels (5a, 5b) interposed between different pairs (3b, 3c; 3a, 3c) of planetary wheels (3a, 3b and 3c).

3. Reduction gear device according to claim 2 further comprising at least a second train-carrier (8) rotatable inside the housing (1) and supporting a second output shaft (11), and a second planetary wheel set (3aa, 3bb, 3cc), pivotally mounted on relative pins of the second train-carrier (8), driven by an induced solar gear wheel integral with the first output shaft (13), which engages with the planetary wheels (3aa, 3bb, 3cc).

4. Reduction gear device according to claim 1 further comprising at least a second train-carrier (8) rotatable inside the housing (1) and supporting a second output shaft (11), and a second planetary wheel set (3aa, 3bb, 3cc), pivotally mounted on relative pins of the second train-carrier (8), driven by an induced solar gear wheel integral with the first output shaft (13), which engages with the planetary wheels (3aa, 3bb, 3cc).

5. Reduction gear device according to claim 4 characterised by having at least a second idle gear wheel (15) pivoted on the second train-carrier (8) and engaged with two wheels (3aa, 3bb) of the second train of planetary wheels (3aa, 3bb, 3cc) in order to increase the used force balancing.

6. Reduction gear device according to claim 5 further comprising additional idle wheels (15, 15a, 15b) interposed between different pairs of planetary wheels (3aa, 3bb and 3cc).

7. Reduction gear device according to claim 1 further comprising an additional train-carrier and trains of cascade connected crown wheels in order to have the output shaft of a previous train-carrier be integral with the input shaft of a following train-carrier.

8. Reduction gear device according to claim 1 characterised by having wheel sets with three or four or five crown wheels.

9. Reduction gear device according to claim 1 further comprising providing only one train-carrier, having a reduction ratio from 1 to 555 and more.

10. Reduction gear device according to claim 1 further comprising providing two train-carriers, having a reduction ratio ranging from 1 to 308025 and more.

\* \* \* \* \*